UNITED STATES PATENT OFFICE.

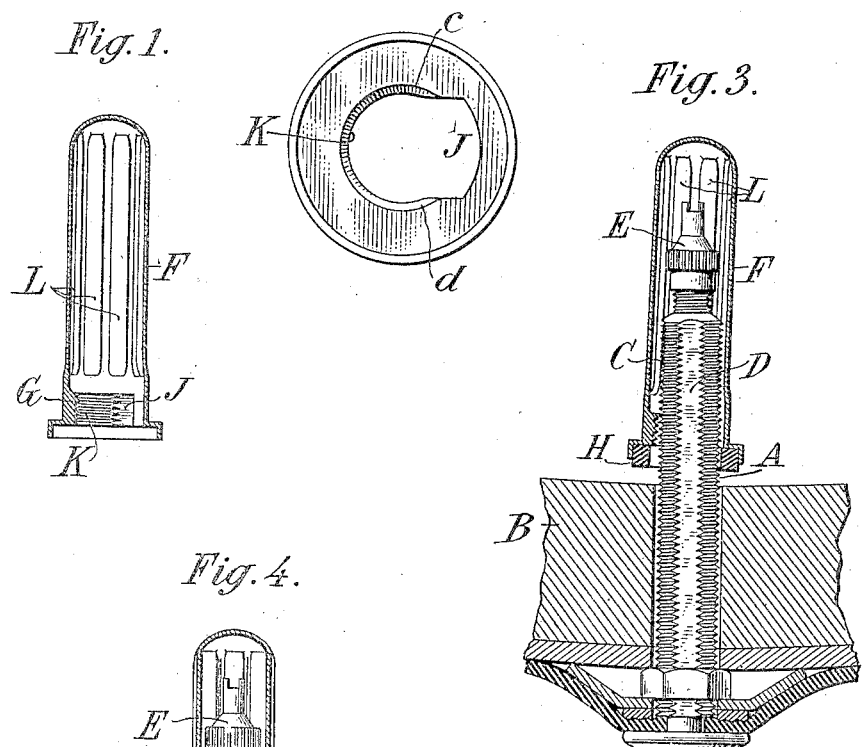

PHILIP W. KAUTZMAN, OF WEST HOBOKEN, NEW JERSEY, ASSIGNOR TO A. SCHRADER'S SON, INCORPORATED, OF BROOKLYN, NEW YORK, A CORPORATION OF NEW YORK.

DUST-CAP.

1,326,455.      Specification of Letters Patent.      Patented Dec. 30, 1919.

Application filed February 20, 1915. Serial No. 9,492.

*To all whom it may concern:*

Be it known that I, PHILIP W. KAUTZMAN, a citizen of the United States of America, residing in West Hoboken, in the county of Hudson and State of New Jersey, have invented certain new and useful Improvements in Dust-Caps, of which the following is a specification.

This invention relates to dust caps for tire valves, and aims to provide certain improvements therein.

The tire valves in common use are formed with a casing which extends from the tire or inner tube inwardly through the rim. Such casings are screw-threaded throughout their length, and are usually formed with oppositely arranged flat surfaces designed to receive a washer or nut which contacts with the rim. The projecting portion of the valve is usually provided with a dust cap designed to protect it from dust and injury. Such dust caps have usually been adapted to screw down the entire length of the projecting portion which often takes considerable time. The present invention is directed to a dust cap which may be quickly attached and detached, and which is simple in construction, and economical to manufacture. The invention also covers other features of improvement which will be hereinafter pointed out.

Referring to the drawings which illustrate the preferred form of the invention,—

Figure 1 is a vertical section of my improved dust cap.

Fig. 2 is an under-side view thereof.

Fig. 3 is a vertical section, showing the cap in the act of being applied.

Fig. 4 is a similar view, showing the cap attached, a section being taken through one of the narrow diameters of the cap.

Referring to the drawings, let A indicate a tire valve, the casing of which ordinarily extends through a rim or felly B of the wheel. Valves of this construction are commonly screw-threaded, as shown at C C, and provided with diametrically opposite flat portions D. The tire valve casing is also provided with a valve cap E screwing on its outer end, and closing the opening through which the working parts of the valve are inserted in the casing and through which air is passed into the tire.

The dust cap provided by the invention is shown in its preferred form at F. It usually comprises a substantially cylindrical section which fits over and incloses the projecting end of the valve casing and a nut portion G which is designed to engage the valve casing. It may be provided with a leather washer, such as H, or may be formed at its lower end in any other desired way.

The nut G is formed on its interior with a cut-away portion or recess J, as best shown in Fig. 2. There remains, however, the screw-threaded portion K which preferably extends more than one-half way around the interior of the nut. The cut-away portion J should preferably remain unthreaded, and should be of such depth as to receive the side of the casing to a sufficient extent to permit the oppositely threaded side of the casing to escape the screw-threads K of the nut when the cap is tilted, as shown in Fig. 3. When the cap is so tilted it hence may be easily pushed along the valve without the necessity of rotating it. When it reaches the position of Fig. 3, however, in which one of its edges contacts with the rim nut or other device immediately ahead of it, its further onward movement can only be accomplished by restoring it to a position in which it is in substantially axial alinement with the valve casing. During this movement the thread K is forced into engagement with the thread of the casing. After this is accomplished a half turn more or less upon the dust cap will tighten it in place either for the purpose of retaining it in position, or for the purpose of clamping the tire valve in lieu of a rim nut. When tightened in place the cap cannot be removed without unscrewing it, since its engagement with the rim or other part ahead of it prevents the tilting movement which is necessary in order to cause the threads K to escape from their engagement with the threads of the casing.

In order to facilitate the engagement of the threaded portion of the nut with the threads of the casing, the threads K of the nut are turned outwardly at *c* and *d* so that these portions of the thread are not true segments of a circle. They hence first engage the threads of the casing and guide the circular portions of the nut threads into engagement with the casing. Preferably, however, the nut is so constructed that the circular portion of its threads extends over more than one-half a circle, with the result that the entrance from the cut-away portion J to the circular portion is slightly constricted. By this means when the cap is applied and slightly turned, that portion of the casing which engages the threads is of too great diameter to pass through the constricted portion. Any lateral movement of the nut when unaccompanied by a tilting movement, is hence prevented under conditions of normal use. It is, however, theoretically possible that when the nut is screwed home it may come to rest with its cut-away portion directly in line with the flats on the casing, in which case there might be a possible opportunity for the cap to move laterally under a blow, and disengage itself. Preferably, however, this is prevented by so constructing the parts that the cut-away portion extends radially outward a greater distance than the interior of the cap wall above it, so that the valve casing contacts with the cap wall before the threads disengage. Thus in the construction shown the portion L of the cap wall is adapted to contact with the valve casing before disengagement of the threads C and G unless the parts be tilted as before-described. The movement of which the parts are capable before disengagement is greater than the depth of the threads since the threads on the casing extend a considerable distance around the sides, and continue to engage the nut after the portions of the threads which are diametrically opposite the cut-away portion have been disengaged.

The invention is applicable to other devices than dust caps, and the nut portion may be used apart from the cap portion.

While I have shown and described one form of the invention, it is understood that I do not wish to be limited thereto, as various changes may be made therein without departing from the invention.

I claim as my invention:—

1. The combination with a threaded stem, of a dust cap having a closed outer end and an unobstructed interior, said cap including a nut having a threaded aperture and a cut away portion leading to the aperture, and the wall of the cap being formed so as to permit tilting upon the stem and to prevent bodily lateral movement of the cap with reference to the stem.

2. A dust cap having a nut having a portion having a screw-threaded aperture, and a cut-away portion leading to said aperture, said screw-threaded portion having a circular part, and having its threads flattened on each side of said screw-threaded portion.

3. A dust cap having a nut portion formed with a part having a screw-threaded aperture, and a cut-away portion leading to said screw-threaded aperture, said screw-threaded part occupying more than one-half of the surface of said aperture, and having its threads flattened on each side of said screw-threaded part.

4. The combination with a threaded stem, of a dust cap, having a closed outer end and an unobstructed interior, the cap including a nut portion with a threaded aperture and a cut away portion leading to the aperture, the portion of the wall of the cap opposite said cut away portion being further removed from the stem than the corresponding portion beyond the nut so as to enable the cap to tilt on the stem without permitting bodily lateral movement of the cap.

5. A one-piece dust cap having a closed outer end and an unobstructed interior, and including a threaded inner end with a cut away portion leading laterally from the threaded part, the cut away portion extending laterally beyond the outer portion of the interior wall of the cap, the threads of said threaded portion being flattened at the sides thereof.

6. The combination with a threaded flattened stem, of a cap having a threaded end and a cut away portion leading laterally from said threaded part, the cap being tiltable upon the stem to permit relative longitudinal movement and means for preventing bodily lateral movement of the cap, whereby the latter is held when in normal position.

7. The combination with a supporting member and a threaded stem projecting therefrom, of a dust cap having a closed outer end and an unobstructed interior, said cap being adapted to engage the supporting member and including a nut portion having a threaded aperture coöperating with said stem, and a cut away portion leading to said aperture, the cap being free to tilt upon the stem when spaced from the supporting member and held against movement laterally of the stem when abutting the supporting member.

In witness whereof, I have hereunto signed my name in the presence of two subscribing witnesses.

PHILIP W. KAUTZMAN.

Witnesses:
 E. G. MYERS,
 FRED WHITE.